United States Patent Office 2,741,610
Patented Apr. 10, 1956

2,741,610

N-SUBSTITUTED DESOXYNORCODEINE COMPOUNDS

Robert L. Clark, Woodbridge, and Karl Pfister III, Westfield, N. J., assignors to Merck & Co., Inc., Rahway, N. J., a corporation of New Jersey No Drawing. Application November 22, 1952,
Serial No. 322,141

12 Claims. (Cl. 260—285)

This invention is concerned generally with novel derivatives of morphine and with processes for preparing these morphine derivatives. More particularly, it relates to novel N-substituted desoxynorcodeine compounds having attached to the nitrogen atom the terminal carbon of a straight aliphatic chain consisting of three carbon atoms, to acid salts thereof, and to novel processes for preparing these compounds starting with desoxynorcodeine or with the corresponding N-substituted desoxynorcodeine compound. These N-substituted desoxynorcodeine compounds, and salts thereof, are active as morphine antagonists.

The N-substituted desoxynorcodeine compounds, and acid salts thereof, subject of the present invention, may be chemically represented by the following structural formulae:

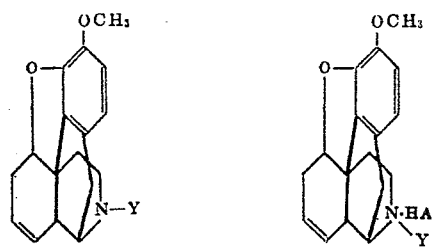

wherein Y is an aliphatic radical containing a straight chain consisting of three carbon atoms a terminal carbon of which is attached to the nitrogen atom, and HA is an acid.

The chemical relationship of these N-substituted desoxynorcodeine compounds to morphine is clear from a comparison of the foregoing formulae with the formula for morphine which is as follows:

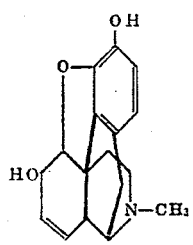

Whereas the alkaloid morphine is a potent analgesic, we have found that N-substituted desoxynorcodeine compounds having attached to the nitrogen atom the terminal carbon of a straight aliphatic chain consisting of three carbon atoms, in particular N-n-propyldesoxynorcodeine, N-isobutyldesoxynorcodeine, N-allyldesoxynorcodeine, N-methallyldesoxynorcodeine, and acid salts thereof do not posses any significant analgesic action but, instead, are strong morphine antagonists and prevent or abolish the analgesic action of morphine when utilized in conjunction with that drug. This antagonistic action possessed by the subject compounds is particularly surprising in view of the fact that other N-alkyldesoxycodeine compounds, such as N-methyldesoxynorcodeine (i. e. desoxycodeine), N - n - butyldesoxynorcodeine, N - amyl - desoxynorcodeine and N-hexyldesoxynorcodeine exhibit no appreciable morphine antagonistic activity.

The N-substituted desoxynorcodeine compounds having attached to the nitrogen atom the terminal carbon of a straight aliphatic chain consisting of three carbon atoms, and acid salts thereof, can be prepared by reactions which may be chemically represented as follows:

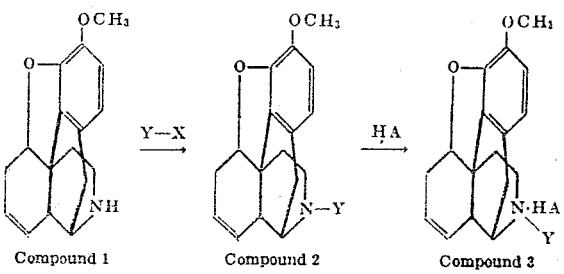

Compound 1        Compound 2        Compound 3 wherein Y is an aliphatic radical containing a straight chain consisting of three carbon atoms a terminal carbon of which is attached to the nitrogen atom, X is a halo radical, and HA is an acid.

The reactions indicated hereinabove are carried out as follows: Desoxynorcodeine (Compound 1) is reacted with an aliphatic halide of the formula Y—X wherein X and Y have the significance defined hereinabove, thereby forming the corresponding N-substituted desoxynorcodeine compound (Compound 2); the latter compound is reacted with an acid to produce the corresponding salt of said N-substituted desoxynorcodeine compound (Compound 3).

The desoxynorcodeine, which is used as a starting material in our novel process, is a new compound which can be prepared by reacting the desoxycodeine with cyanogen bromide in a solvent. Suitable media for this reaction are nonpolar solvents for desoxycodeine such as benzene, toluene, chloroform and carbon tetrachloride. Chloroform is the preferred solvent for this reaction. The reaction is preferably carried out at reflux temperatures so that the methyl bromide is expelled as formed. The reaction time does not appear to be critical; however, a reflux period of from one to five hours appears to be sufficient. The cooled reaction mixture is diluted with ether to precipitate desoxycodeine methyl bromide formed during the reaction; the latter is removed by filtration and the filtrate concentrated under reduced pressure to a small volume from which N-cyanodesoxynorcodeine may be recovered.

The step of converting N-cyanodesoxynorcodeine to desoxynorcodeine involves both hydrolysis of the nitrile and decarboxylation of the carboxylic acid thus formed. This may be accomplished by heating N-cyanodesoxynorcodeine with an aqueous solution of a non-oxidizing mineral acid. The concentration of the mineral acid is not critical and good results have been obtained by employing one-half normal hydrochloric acid. It has been found advantageous to add a small amount of a lower aliphatic carboxylic acid such as acetic acid to the reaction mixture. The mixture is then heated to a temperature of about 70–100° C. until the evolution of carbon dioxide has ceased. The reaction mixture is then cooled, neutralized and desoxynorcodeine extracted into a suitable organic solvent such as diethylether; the solvent is evaporated from this extract, preferably under reduced pressure to give the desired desoxynorcodeine.

The aliphatic halides which react with desoxynorcodeine to form our novel N-substituted desoxynorcodeine compounds contain a straight aliphatic chain consisting of three carbon atoms the terminal carbon of which is attached to the halogen atom; in one preferred embodiment of our invention, a methyl grouping is connected to the middle carbon atom of this straight aliphatic chain. We prefer to employ as the aliphatic halide an n-propyl halide such as n-propyl chloride, n-propyl bromide, n-propyl iodide, an isobutyl halide such as isobutyl chloride, isobutyl bromide, isobutyl iodide, an allyl halide such as allyl chloride, allyl bromide, allyl iodide, a methallyl halide such as methallyl chloride, methallyl bromide, methallyl iodide, and the like. The reaction between the aliphatic halide and desoxynorcodeine is ordinarily conducted by heating the reactants together in contact with an acid-binding agent in a liquid medium which is substantially inert under the reaction conditions and which is a solvent for the reactants. We prefer to utilize, as the liquid medium, a lower aliphatic alcohol such as methanol, ethanol, propanol, and the like. The liquid medium employed should be substantially free of water. As the acid-binding agent we ordinarily utilize an alkali metal carbonate, such as sodium carbonate, potassium carbonate, an alkali metal bicarbonate such as sodium bicarbonate, potassium bicarbonate, an alkaline earth metal carbonate, such as calcium carbonate, barium carbonate, and the like. We prefer to conduct the reaction by bringing together, in an organic solvent, approximately equimolar quantities of desoxynorcodeine and the aliphatic halide, and heating the solution under reflux in contact with an excess of the acid-binding agent for an extended period of time. We have found that, under these reaction conditions, a heating period of about ten hours or more is ordinarily required to complete the reaction between the desoxynorcodeine and the aliphatic halide.

In accordance with the foregoing procedure, there is obtained the corresponding N-substituted desoxynorcodeine compound having attached to the nitrogen atom the terminal carbon of a straight aliphatic chain consisting of three carbon atoms which may have a methyl grouping attached to the middle carbon atom of said chain, as, for example, N-n-propyldesoxynorcodeine, N-isobutyldesoxynorcodeine, N-allyldesoxynorcodeine, and N-methallyldesoxynorcodeine. The N-substituted desoxynorcodeine is conveniently recovered by evaporating the organic solvent from the reaction mixture, preferably under reduced pressure, and extracting the residual material with a solvent such as ether. The ethereal extract is filtered and the filtered solution is evaporated to dryness to give the N-substituted desoxynorcodeine compound in crude form; this crude material can be purified by recrystallization from a solvent comprising lower aliphatic alcohols such as methanol and ethanol.

Alternatively, the N-substituted desoxynorcodeine compounds having attached to the nitrogen atom a terminal carbon of a straight aliphatic chain consisting of three carbon atoms may be prepared by reacting the corresponding N-substituted norcodeine compound with an organic sulfonyl halide in the presence of a proton acceptor to produce the corresponding N-substituted-6-(organic sulfonyl)-norcodeine compound, and reacting the latter compound with lithium aluminum hydride, thereby forming the desired N-substituted desoxynorcodeine compound.

The N-substituted norcodeine compounds utilized as starting materials in this alternate procedure, namely, the N-alkylnorcodeine compounds and the N-alkenylnorcodeine compounds can be prepared by reacting normorphine with the appropriate aliphatic halide in the presence of an acid-binding agent utilizing substantially the same procedure as that described hereinabove in connection with the reaction between desoxynorcodeine and aliphatic halides, thereby forming the corresponding N-substituted normorphine having attached to the nitrogen atom a terminal carbon of a straight aliphatic chain consisting of three carbon atoms, such as N-n-propylnormorphine, N-isobutylnormorphine, N-allylnormorphine, N-methallylnormorphine, and the like; this N-substituted normorphine compound is reacted, in ethanol, with phenyltrimethyl-ammonium hydroxide to form the corresponding N-substituted norcodeine compound.

This N-substituted norcodeine compound is then reacted with an organic sulfonyl halide, or an organic sulfonic acid, as, for example, an aryl sulfonyl halide such as p-toluene sulfonyl chloride, thereby esterifying the hydroxyl substituent in the 6-position to produce the corresponding N-substituted-6-(organic sulfonyl)-norcodeine. This esterification reaction is ordinarily conducted in the presence of a proton accepting organic compound, preferably a tertiary amine such as pyridine, quinoline, triethylamine, dimethylaniline, and the like. The reaction is preferably carried out by reacting under substantially anhydrous conditions and at a temperature of about 0–15° C. a mixture of the N-substituted norcodeine, organic sulfonyl halide and tertiary amine for a period of about 3 to 5 hours. The reaction mixture is neutralized with an aqueous solution of a weak inorganic base such as sodium bicarbonate or sodium carbonate, whereupon the N-substituted-6-(organic sulfonyl)-norcodeine compound separates as a gummy precipitate; this material can be purified, if desired, by reaction with alcoholic hydrogen bromide, thereby forming the corresponding N-substituted-6-(organic sulfonyl)-norcodeine hydrobromide in crystalline form; this hydrobromide is reconverted by treatment with a mildly alkaline aqueous solution, to crystalline N-substituted-6-(organic sulfonyl)-norcodeine compound. The latter compound is then reacted with lithium aluminum hydride to form the corresponding N-substituted-desoxynorcodeine compound. The reaction is ordinarily conducted by heating the reactants together in the presence of a liquid medium, and preferably at a temperature of approximately 50–100° C. for a period of about three to five hours. As the liquid medium we ordinarily utilize a saturated ether, preferably those having boiling points between about 50° C. and 100° C., such as dipropyl ether, dioxane and tetrahydrofuran. We prefer to use tetrahydrofuran (which has a boiling point of 63° C.) as the liquid medium and to conduct the reaction at the reflux temperature of this solvent. At the end of the reaction period, water is cautiously added to the reaction mixture, thereby decomposing excess lithium aluminum hydride. The resulting aqueous mixture is then extracted with an organic solvent such as chloroform, the chloroform extract is evaporated, and the residual material is recrystallized from a solvent such as ethanol to give, in substantially pure form, the corresponding N-substituted desoxynorcodeine compound having attached to the nitrogen atom a terminal carbon of a straight aliphatic chain consisting of three carbon atoms such as N-n-propyldesoxynorcodeine, N-isobutyldesoxynorcodeine, N-allyldesoxynorcodeine, N-methallyldesoxynorcodeine, and the like.

The conversion of the N-substituted desoxynorcodeine compounds to the corresponding acid salts is ordinarily conducted by reacting the N-substituted desoxynorcodeine compound under substantially anhydrous conditions, with an acid, as for example, hydrogen chloride, hydrogen bromide, sulfuric acid, acetic acid, tartaric acid, citric acid, and the like. This salt-forming reaction is conveniently carried out by dissolving the N-substituted desoxynorcodeine compound in a hot lower alkanol, such as ethanol, methanol, propanol, and the like, and adding to the solution a slight excess of an alcoholic solution of the appropriate acid. Upon diluting the resulting alcoholic medium with an alcohol-miscible non-solvent for the product, such as diethyl ether, there crystallizes from the mixture the acid salt of the N-substituted desoxynorcodeine compound, such as N-n-propyldesoxynorcodeine hydrochloride, N-n-propyldesoxynorcodeine hydrobromide, N-n-propyldesoxynorcodeine sulfate, N-n-propyldesoxynorcodeine acetate, N-n-propyldesoxynorcodeine tartrate, N-isobutyldesoxynorcodeine hydrochloride, N-isobutyldesoxynorcodeine hydrobromide, N-isobutyldesoxynorcodeine sulfate, N-isobutyldesoxynorcodeine acetate, N-isobutyldesoxynorcodeine tartrate, N-allyldesoxynorcodeine hydrochloride, N-allyldesoxynorcodeine hydrobromide, N-allyldesoxynorcodeine sulfate, N-allyldesoxynorcodeine acetate, N-allyldesoxynorcodeine tartrate, N-methallyldesoxynorcodeine hydrochloride, N-methallyldesoxynorcodeine hydrobromide, N-methallyldesoxynorcodeine sulfate, N-methallyldesoxynorcodeine acetate, N-methallyldesoxynorcodeine tartrate, and the like. The salt thus formed is recovered from the alcoholic slurry by filtration or centrifugation.

The following examples illustrate methods of carrying out the present invention, but it is to be understood that these examples are given for purposes of illustration and not of limitation.

Example 1

A mixture of 4 g. of desoxynorcodeine, 1.78 g. of sodium bicarbonate, 2.52 g. of n-propyl iodide and 50 ml. of absolute ethanol was heated under reflux with stirring for a period of about twenty-four hours. At the end of this period some insoluble material was present and was removed by filtration. The filtered solution was evaporated to dryness under reduced pressure; the residual material was slurried with several portions of diethyl ether, and the ethereal extract was filtered. The filtered ethereal solution was concentrated in vacuo to give N-n-propyl-desoxynorcodeine which was obtained in the form of an oil which crystallized upon cooling.

The N-n-propyldesoxynorcodeine was reacted with ethanolic hydrogen bromide, and the crystalline product which separated was recovered by filtration and purified by recrystallization from ethanol-ether to give substantially pure N-n-propyldesoxynorcodeine hydrobromide; M. P. 281–283° C. $[\alpha]_D^{25} = -34°$ (c, 0.8 in ethanol).

*Analysis.*—Calculated for $C_{20}H_{25}NO_2 \cdot HBr$: C, 61.23; H, 6.68. Found: C, 60.93; H, 6.88.

The descoxynorcodeine utilized as starting material in the foregoing process was prepared in accordance with the following two-step procedure: (1) A solution of 7.8 g. of cyanogen bromide in 25 ml. of dry chloroform was stirred and heated under reflux while adding thereto, dropwise over a period of one hour, a solution of 19.0 g. of desoxycodeine in 45 ml. of dry chloroform. The resulting solution was heated under reflux for an additional period of five hours. The reaction mixture was cooled and diluted with 400 ml. of ether. The ethereal solution was separated from the gummy material which precipitated by filtration and the filtered ethereal solution was evaporated to small volume under reduced pressure. The concentrated solution was cooled and the crystalline material which separated was recrystallized from ethyl acetate to give substantially pure N-cyanodesoxynorcodeine; M. P. 149–150° C.; $[\alpha]_D^{25} = -130°$ (c, 0.75 in absolute ethanol).

*Analysis.*—Calculated for $C_{18}H_{18}N_2O_2$: C, 73.45; H. 6.16. Found: C, 73.60; H, 6.20.

(2) A mixture of 33 g. of N-cyanodesoxynorcodeine, 128 ml. of glacial acetic acid, 45 ml. of concentrated aqueous hydrochloric acid and 900 ml. of distilled water was heated at a temperature of about 90° C. for a period of about ninety hours. The resulting reaction mixture was decolorized by filtration through a mat of activated charcoal. The substantially decolorized, light-yellow filtrate was cooled to about room temperature and an aqueous solution of ammonium hydroxide was added thereto portionwise, whereupon an oil separated. The portionwise addition of the aqueous ammonium hydroxide was continued until no further oil separated. The resulting mixture was then extracted with three portions of ether, the combined ethereal extracts were dried over magnesium sulfate and the ether was evaporated from the dried ethereal solution under reduced pressure. The residual crystalline material was recrystallized from ether to give substantially pure desoxynorcodeine; M. P. 85–86° C.; $[\alpha]_D^{25} = -59°$ (c, 1.2 in obsolute ethanol).

*Analysis.*—Calculated for $C_{17}H_{19}NO_{20}$: C, 75.78; H, 7.11. Found: C, 74.67; H, 6.89.

Example 2

A solution of 3.25 g. of N-allylnorcodeine in 3.2 ml. of dry pyridine was cooled to a temperature of about −10° C. and to the cold solution was added a solution of 2.2 g. of p-toluene sulfonylchloride in 2.2 ml. of dry pyridine. The resulting mixture was allowed to stand at a temperature of 0° C. for a period of four hours and the reaction mixture was then poured into 110 ml. of cold water containing 1.5 g. of sodium bicarbonate. The gummy material which precipitated was recovered by decantation, washed with cold water and extracted with chloroform. The chloroform extract was washed with water, then with an aqueous solution of sodium bicarbonate, and again with water. The chloroform was evaporated under reduced pressure from the washed chloroform extract, and the residual gummy material was dissolved in ether. To this ether solution was added an excess of ethanolic hydrogen bromide, and the crystalline material which precipitated was recovered by filtration and recrystallized from methanol to give substantially pure 6-(p-toluenesulfonyl)-N-allylnorcodeine hydrochloride; M. P. 145–146° C. This material was dissolved in water, dilute aqueous sodium hydroxide was added to the solution, and the resulting aqueous alkaline mixture was extracted with ether. The ethereal extract was washed with water, dried and the ether evaporated to give crystalline 6-(p-toluenesulfonyl)-N-allylnorcodeine; M. P. 110–111° C.

A solution of 2 g. of 6-(p-ptoluenesulfonyl)-N-allylnorcodeine in 20 ml. of purified tetrahydrofuran was slowly added to a solution of 0.6 g. of lithium aluminum hydride in 30 ml. of purified tetrahydrofuran. After the initial mildly exothermic reaction had subsided, the mixture was heated under reflux for a period of four hours. Fifty milliliters of ether was added to the reaction mixture followed by the dropwise addition of water to decompose unreacted lithium aluminum hydride. The crystalline material which precipitated was recovered by filtration and dissolved in hot ether. The ethereal solution was washed with water, dried over anhydrous magnesium sulfate, and the dry ethereal solution was evaporated to dryness. The residual material was recrystallized from ether to give substantially pure N-allyldesoxynorcodeine; having a melting point of 75–77° C., $[\alpha]_D^{25} = -98°$ (c, 1.0 absolute ethanol).

*Analysis.*—Calculated for $C_{20}H_{23}NO_2$: C, 77.63; H, 7.49. Found: C, 77.93; H, 7.36.

The N-allylnorcodeine utilized as starting material in the foregoing process can be prepared in accordance with the following two-step procedure: (1) thirty-five grams of normorphine and 7.95 g. of allyl bromide is dissolved in 350 cc. of chloroform and the solution is heated in a sealed tube at a temperature of 110° C. for a period of three and one-half hours. The reaction mixture is filtered, and the residual solid material extracted with chloroform. The chloroform extract is evaporated to dryness in vacuo, and the residual material is triturated with 75 cc. of ether. The resulting mixture is cooled to approximately 0° C. and maintained at that temperature for a period of about two hours. The precipitated material is recovered from the resulting slurry by filtration, and is extracted for fifteen hours with anhydrous ether utilizing a Soxhlet extractor. The ether extract is evaporated in the absence of air to incipient crystallization, cooled to 0° C. and maintained at that temperature for a period of about fifteen hours. The crystalline material which separates is recovered by filtration, washed with ether and dried in vacuo to give substantially pure N-allylnormorphine; M. P. 208–209° C.

(2) One equivalent weight of phenyltrimethylammonium chloride is added to an ethanol solution containing approximately one equivalent weight of sodium ethoxide. The resulting mixture is filtered thereby removing the precipitated sodium chloride, and to the filtered ethanolic solution containing approximately one equivalent of phenyltrimethylammonium hydroxide is added one equivalent weight of N-allylnormorphine. The resulting mixture is heated and the ethanol distilled therefrom until the temperature of the distilland is approximately 120° C. The reaction mixture is then cooled and an excess of acetic acid (approximately 1.2 equivalents) is added to the cooled mixture. The resulting mixture is subjected to steam distillation thereby steam distilling the by-product dimethyl aniline. To the aqueous distilland is added sufficient aqueous sodium hydroxide solution to render the mixture slightly alkaline, and this aqueous alkaline mixture is extracted with chloroform. The chloroform is evaporated from the resulting chloroform extract, and the residual crystalline material is washed with ether and dried to give N-allylnorcodeine.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group consisting of an N-substituted desoxynorcodeine compound having attached to the nitrogen atom a radical selected from the group consisting of N-n-propyl, N-isobutyl, N-allyl and N-methallyl radicals, and acid addition salts thereof.
2. N-n-propyldesoxynorcodeine.
3. N-n-propyldesoxynorcodeine hydrochloride.
4. N-allyldesoxynorcodeine.
5. N-allyldesoxynorcodeine sulfate.
6. The process that comprises reacting desoxynorcodeine with an aliphatic halide, selected from the group which consists of N-n-propyl halides, N-isobutyl halides, N-allyl halides and N-methallyl halides, to form the corresponding N-substituted desoxynorcodeine compound.
7. The process that comprises reacting desoxynorcodeine with an n-propyl halide to form N-n-propyldesoxynorcodeine.
8. The process that comprises reacting desoxynorcodeine with an allyl halide to form N-allyldesoxynorcodeine.
9. The process that comprises reacting an N-substituted norcodeine compound having attached to the nitrogen atom a radical selected from the group consisting of N-n-propyl, N-isobutyl, N-allyl and N-methallyl radicals with a sulfonyl halide to form N-substituted-6-(organic sulfonyl)-norcodeine and reacting the latter compound with lithium aluminum hydride to form the corresponding N-substituted desoxynorcodeine.
10. The process that comprises reacting N-n-propylnorcodeine with p-toluene sulfonyl halide to form 6-(p-toluenesulfonyl)-N-n-propylnorcodeine and reacting the latter compound with lithium aluminum hydride to form the compound N-n-propyldesoxynorcodeine.
11. The process that comprises reacting N-allylnorcodeine with a p-toluene sulfonyl halide to form 6-(p-toluenesulfonyl)-N-allylnorcodeine and reacting the latter compound with lithium aluminum hydride to form the compound N-allylnorcodeine.
12. N-n-propyldesoxynorcodeine sulfate.

References Cited in the file of this patent
UNITED STATES PATENTS 2,178,010   Small   Oct. 31, 1939

OTHER REFERENCES

Manske et al.: The Alkaloids, Academic Press (1952), pp. 28–29.

Small, J.: Org. Chem., vol. 3, p. 214 (1938).